(No Model.) 4 Sheets—Sheet 2.

J. A. BRILL & W. S. ADAMS.
MOTOR TRUCK.

No. 504,149. Patented Aug. 29, 1893.

ATTEST:
H. F. Durbin.
M. E. Stoddard.

INVENTORS:
Walter S. Adams
John A. Brill
By Joseph L. Levy
Attorney (No Model.) 4 Sheets—Sheet 3.

J. A. BRILL & W. S. ADAMS.
MOTOR TRUCK.

No. 504,149. Patented Aug. 29, 1893.

ATTEST:
H. F. Dunbar.
M. E. Stoddard.

INVENTORS:
Walter S. Adams
John A. Brill
By Joseph L. Levy
Attorney (No Model.) 4 Sheets—Sheet 4.
J. A. BRILL & W. S. ADAMS.
MOTOR TRUCK.
No. 504,149. Patented Aug. 29, 1893.
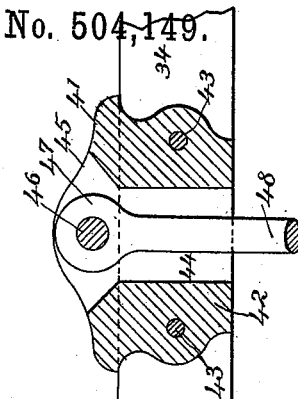
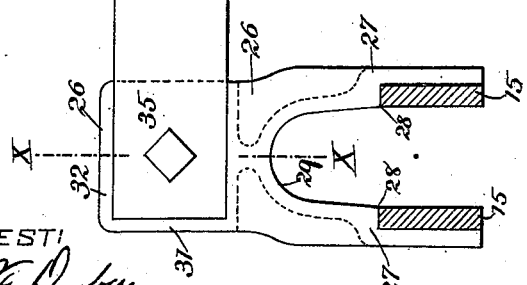
ATTEST:
H. F. Dubur
M. E. Stoddard
INVENTORS:
Walter S. Adams
John A. Brill
By Joseph L. Levy
Attorney

UNITED STATES PATENT OFFICE.

JOHN A. BRILL AND WALTER S. ADAMS, OF PHILADELPHIA, PENNSYLVANIA; SAID ADAMS ASSIGNOR TO SAID BRILL.

MOTOR-TRUCK.

SPECIFICATION forming part of Letters Patent No. 504,149, dated August 29, 1893.

Application filed November 12, 1891. Serial No. 411,752. (No model.)

*To all whom it may concern:*

Be it known that we, JOHN A. BRILL and WALTER S. ADAMS, citizens of the United States, residing at Philadelphia, in the county of Philadelphia and State of Pennsylvania, have made certain new and useful Improvements in Motor-Trucks, of which the following is a specification.

Our invention has primarily for its object the support of a motor upon one or both of the axles of the truck in such a way as to permit the removal of the wheels and axle and the motor sleeved upon it by the removal of a few bolts; and the invention particularly relates to the support of what are termed gearless motors on the truck. These motors usually have their armatures fast to the axle and the field magnets supported about the armature in many ways. The particular class to which our invention is applied extends away from the axle on both sides. It is well known that a motor truck which is so adapted as to permit the removal of the motor with expedition and without materially dismembering the truck structure is a very desirable feature in truck construction; and this end we have attained by the present structure.

Our invention further consists in details of construction used for supporting the motor, as will be hereinafter set forth.

Figure 1:
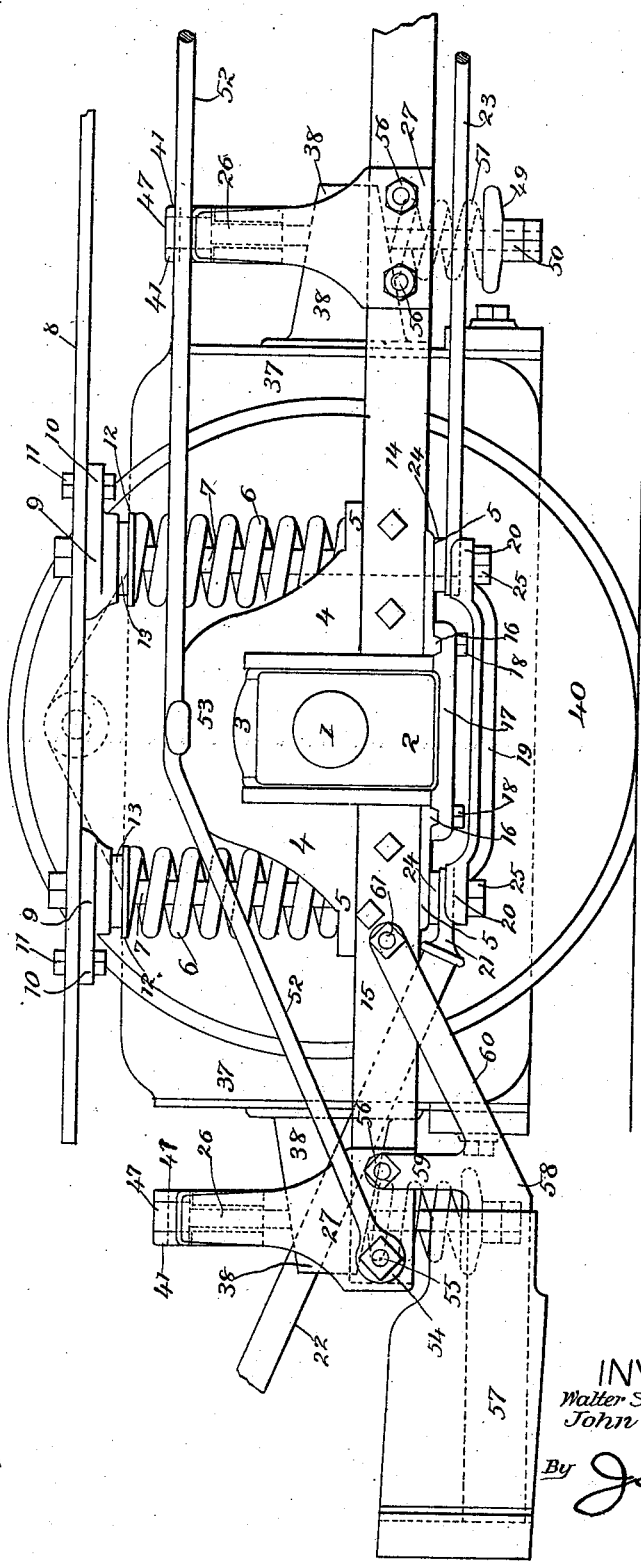
Figure 2:
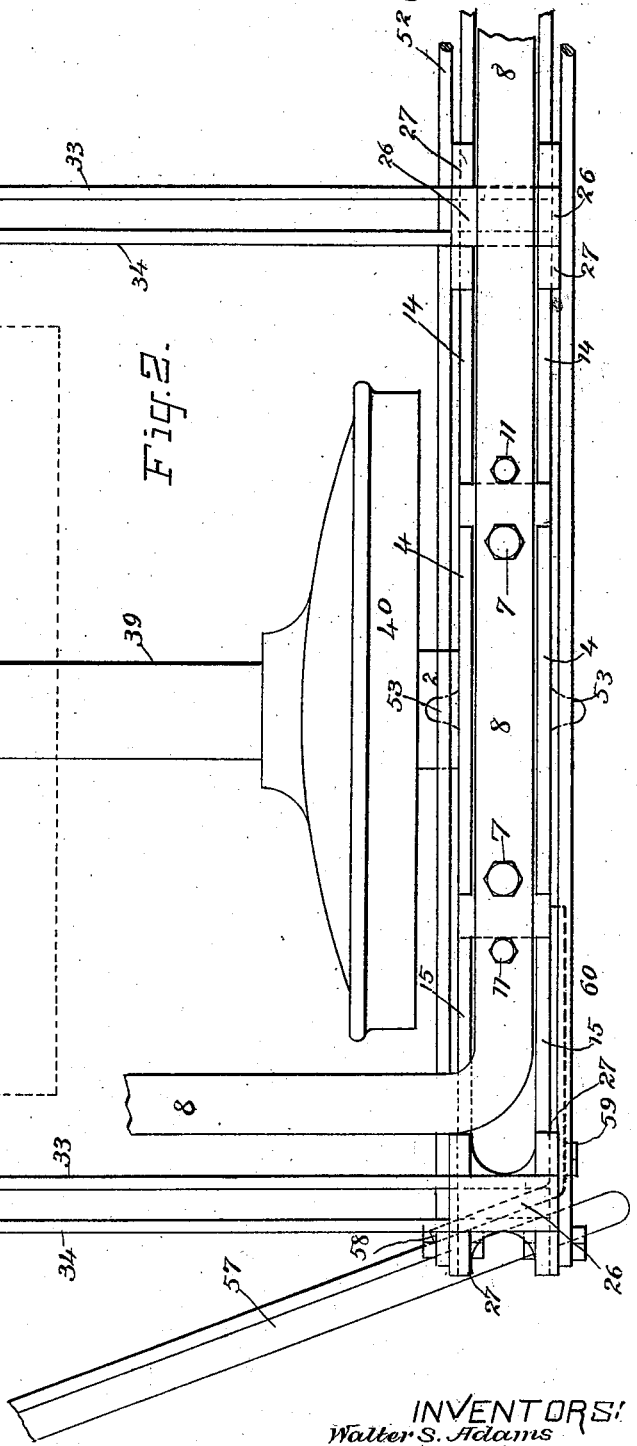
Figure 3:
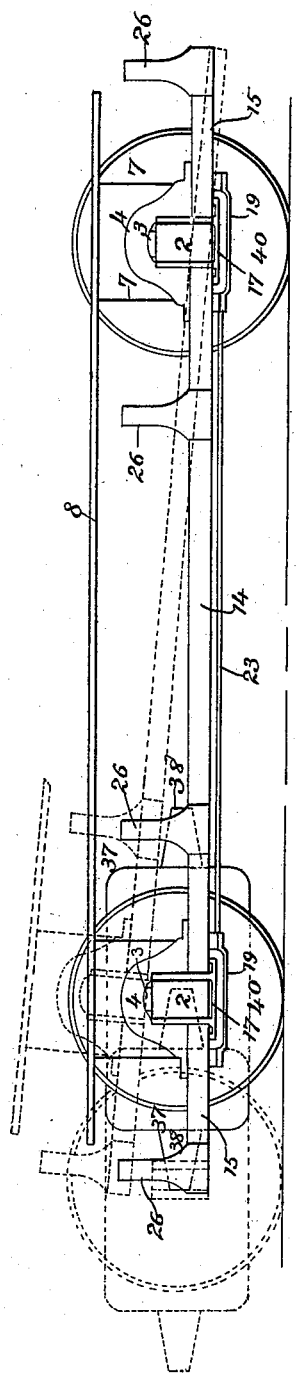

In the drawings, Figure 1 is a side elevation of a portion of the truck, showing a motor sleeved upon its axle. Fig. 2 is a plan view of Fig. 1, showing one side and one end of the truck and motor supports. Fig. 3 is a diagrammatic view illustrating the method of taking out the motor from the truck. Fig. 4 is an enlarged side elevation of the motor support shown in Figs. 1 and 2. Fig. 5 is a detailed sectional view, taken on the line X, X of Fig. 4.

In the drawings, 1 is the axle, 2, the axle box, 3, elastic cushions upon the axle box, and 4, the saddles which are supported upon the axle box by means of the elastic cushion 3. The saddle is provided with projections 5, which form the supports for the truck springs 6, and through which projections the spring posts 7 pass.

8 is the upper chord of the truck rectangular in shape and preferably continuous throughout. To the upper chord is secured an independent spring cap 9 apertured to permit the spring posts 7 to pass through and which are provided with a lug 10. A bolt 11 passes through the upper chord and secures the spring cap 9 thereto. The lug 10 and bolt 11 prevent the individual spring cap from turning, and by its presence the necessity of making the spring cap for the series of truck springs continuous between the spring posts is obviated. They can therefore be made much lighter and cheaper. In the old structure, to wit: a continuous spring cap, a fracture of the same would necessarily require the removal of a cap for each spring, whereas in the present structure when a spring cap is fractured, it alone need be removed.

On top of the spring 6 is placed a plate 12, the spring post passing through it; and between the plate 12 and spring cap 9 is secured an elastic cushion 13. The projections 5 of the saddles 4 are preferably countersunk to receive the side bars 14, 15 on each side thereof, as seen in Fig. 2, the bar 15 extending outwardly from the saddles and the bar 14 extending between the saddles on both ends of the truck. Bosses 16 are formed on the lower portions of the saddles, the saddles being opened below the axle box. Across this opening is secured the bar 17, being countersunk to receive the bosses 16 and secured to the saddles by means of the bolt 18. Below the cross bar 17 is located a cross brace 19 secured to the spring posts, the ends 20 of which are provided with a seat on the outer side for the short bar or bib 21 to which the diagonal truss brace 22 is secured, said brace passing between the side bars 15, and at the other end of said cross brace 19, is a like seat 20 in which the longitudinal truss brace 23 is seated, said brace joining a like structure about the axle boxes at the other end of the truck. Between the bib 21, the brace 23 and the lower portion of the saddle extension 5 are preferably secured elastic blocks 24, nuts 25 on the ends of the spring posts uniting the before stated structure. It will thus be seen from the structure before described that the freeing of the nuts 18 and 25 will permit the cross bar 17 and cross brace 19 to be removed, thus permitting the side bars being lifted off the axle boxes to enable the wheels, axles, axle boxes and motor supported on the axle to be run out from under the truck, it only being necessary to adapt the supports for a part of the motor not sleeved on the axle, and which are carried by the side bars so that the motor can pass underneath them. Said supports are constructed as follows: In the present construction there are two sets of motor supports for one motor, and as they are constructed identical, a description of one will suffice for the description of the other. 26 are upwardly extending supports or standards, which standards are bifurcated and provided with legs 27, where the side bars 14, or 15 engage with the legs of the standard. Said legs are preferably made smaller in diameter than the main portion thereof and shouldered at 28 to provide a support for the standard on the side beams and enable the side beams to fit the legs flush on the inside thereof. An elevated arch 29 is formed between the legs 27 to permit the diagonal brace 22 to extend upwardly between the side beams under the standard to the extended portion of the car body. By reference to Fig. 5, it will be seen that the upper portion of the standard is indented or countersunk, as at 30, such countersunk portions preferably not extending fully across the head of the standard, as seen at 31, Fig. 4. The countersinks 30 are also solidly walled over by the flanged portions 32 of the heads of the standards, and within the countersinks of which are the ends of two transversely extending beams 33, 34. These beams are preferably made of wrought iron, and are as shown in the drawings, placed on edge, whereby the greatest strength, reduction in weight in material and saving of space is attained. Supports for motors so far as we know which have been extended from the side beams across the truck have been made of flat bar iron or of angle iron with the flat side uppermost. In order to get the desired strength of this latter mentioned means of support, these transversely extending beams have either to be made of angle iron, heavy and wide, or of flat bar iron with bracing for the same, which have taken up a great deal of space and which have made this form of rigging expensive. Our structure avoids these difficulties and by reference to Fig. 5, it will be clearly seen that by reason of the transverse beams 33 being supported on edge, a much narrower and lighter structure will be had, and that the flanges 31, 32 prevent the transverse bars from moving laterally or perpendicularly, so that a very rigid structure is obtained in which there will be very little necessity of using bolts for securing the ends of said transverse beams with the standard. One bolt 35 is shown in the drawings for that purpose, but it is only used to keep the ends of the said beams in place and takes no strain, the downward strain of the support being taken on the lower flanges 36 of the standard end. By reference to Fig. 2, it will be seen that the beams 33, 34 are spaced apart.

The motor shown herein for the purpose of illustrating the motor support is what is known as a gearless motor, the armature of which is either constructed with or secured upon the truck axle, and which comprises essentially the body 37 and noses 38, said body 37 being supported upon the axle 39. The nose 38 of the motor preferably extends under the transverse bars 33, 34. Upon the bars 33, 34 and preferably over the nose 38 of the motor we secure a thimble 41, which has a downwardly extending central leg 42 adapted to fit in a space between the two bars 33, 34, bolts 43 securing the thimble in place. The thimble is flanged at each side to permit the thimble to rest upon the tops of said beams. The thimble is provided with a centrally disposed aperture 44 flared at 45. Through the top of the thimble passes a bolt 46 to which the eye 47 of a pendant 48 is secured, which passes down through the aperture 44. The nose 38 of the motor is apertured to permit the pendant 48 to pass through it, and upon the lower end of the pendant is secured the spring cap 49 by means of the nuts 50. Between the lower face of the nose 38 of the motor and the spring cap 49, is placed a spring 51 which surrounds the pendant 48.

In the present structure it is not necessary to have a spring above the nose of the pendant, by reason of the fact that the motor has springs below the nose 38 on each end thereof, so that any oscillation of one end of the motor will be taken up by the springs of the other. A brace 52 which extends between the extended ends of the side beams rests upon a lug 53 formed on the saddle 4, the ends of said brace being secured to the extended ends of the side beams. In the present structure the ends of the brace 52 are provided with an eye 54 through which a bolt 55 passes, said bolt 55 passing through one of the side beams 15 through one of the legs 27 of the standard 26, the said side beams, standard and eye of the brace 52 being firmly secured together. Like bolts 56 secure the legs 27 of the standards to the side beams. This brace takes the strain of the motor from off the extended portions 15 of the side beams from which it would but for the presence of this brace be transferred to the saddle 4, straining and in many cases breaking it. We however, do not broadly claim this brace herein, as the same is shown, described and claimed in an application, filed by George Martin Brill on the 26th day of June, 1891, Serial No. 397,563. This truss also braces the extended end of the side beams against the superposed weight of the fender 57 which is supported upon the side beams 15 by means of the forked bar 58, the fork 59 of which is secured to the bolt 56, passing through the leg of the standard and side bar, the other fork 60 being secured to the bolt 61 on the side bars.

Fig. 3 represents the method of getting the motor out from the truck. It will be seen that the upper portion of the body 37 of the motor, when all the parts of the truck are in position, extends above the standards 26, and that the wheel, axle and motor cannot be run out from the truck without coming in contact with the cross bars of the support, and where the nose of the motor is supported on a transverse bar flush or level with the side beams, the same difficulty exists. If the support for the nose of the motor were level with the side beams, the removal of the motor could not be had without either unshipping the side beams or lifting the end of the truck up until the beams were higher than the motor and the wheel. In many cases it will be found extremely inexpedient to do this, and in others impossible by the reason of the fact that the side beams on the other end of the truck will strike the ground. These difficulties have in a measure been overcome by running the truck over a pit for the purpose of such removal. By reason of the structure of our support and the arrangement of the parts thereof, it is not necessary to remove the side beams, nor place the truck over a pit for the purpose of removing the wheel, axle and motor, as the same can be done by vibrating one end of the truck upon the axle, at the other end lifting it until the under portion of the transverse beams 33, 34 or the bars 62, 63 of the modification are just higher than either the wheel or the motor, according to which may be the higher, the truck then being held up, in which position, the motor, wheel and axle can be run off, as shown in the drawings. During this operation, that is the lifting of the side beams, standards, &c., the axle boxes will be left on the ends of the axles, so that when the wheel and axle are run out, the axle box will be carried with them.

The side bars of the truck are shown in dotted lines in their elevated position, and at the end opposite to that from which the motor is being removed have but very little vibration.

The truck shown in the drawings is intended to represent what is known as a short wheel base truck by which a minimum of vibration of the ends of the truck during the removal of the motor is attained. Where the wheel base is more extensive, the vibration of the side beams at the end of the truck opposite that from which the motor is being removed will be still less, and by reason of the reduction of parts about and below the axle boxes, their removal from the truck is more readily accomplished. Of course during the removal of the motor, the nuts 50, spring plates 49 and spring 51 must be removed from the pendant 48, or the bolt 46 in the thimble 41 could be removed permitting the pendant 49 to drop through the aperture 44, the eye 47 being adapted to pass through it.

The entire operation of unshipping the motor, axle and wheel from the truck could be accomplished by dropping the pendant from the bolt 46, unshipping the cross bar 17 by removing the bolts 18 and unshipping the cross brace 19 by removing the bolts 25.

Any form of motor can be used, the field magnets thereof supported in a suitable frame, and the armature directly connected with the axle, or this may be reversed, so that the armature remains stationary and the field magnets rotated.

When the terms "open" or "clear below the axle boxes" are used in the claims, it is intended to convey the idea that no fixed part of the axle box frame extends below the opening across the axle boxes, but only such parts as are movable, as the cross bar 17 and cross brace 19. It will thus be seen that very few parts have to be detached in order to accomplish the removal of the wheel, axle and motor before described.

We claim—

1. The combination with a truck axle, of the motor extending transversely thereof, and means for supporting the motor on or about the axle, comprising uprights secured to the side beams of the truck and extending upwardly therefrom, and cross bars uniting the uprights, the axle and motor being between the cross bars, and supports for the free end of the motor, depending from the cross bars which lie above said free ends, substantially as described.

2. The combination, in a truck, of a motor supported in part on a truck axle, a truck frame adapted to be lifted from the axle boxes, and a support for an end of the motor, extending across the end of the truck frame, the frame being otherwise unobstructed at that end, said support being of such a height relatively to the height of the motor that when the truck frame is raised to clear the axle boxes, the support will clear the motor, substantially as described.

3. The combination in a truck having side beams supported on the axle boxes thereof, upwardly disposed supports on the side beams at both sides of the axle boxes, a motor having free ends extending forwardly and rearwardly from the axle, a removable pendant hung from said supports which engage the free ends of said motor, said upwardly disposed supports being of such height as to permit the running of the motor under them when the side beams or appendages have been raised to clear the top of the axle boxes, substantially as described.

4. Side bars, upwardly extending supports thereon, said supports being recessed on both sides, and transverse bars secured on edge within said recesses, substantially as described.

5. The combination in a truck, of a motor in gear with the truck axle and extending away from the axle on both sides thereof, side uprights at front and rear of the axle and cross bars on the uprights, forming supports for the free ends of said motor, said supports carrying springs and being independent of the motor or its framing, substantially as described.

6. The combination in a truck, of a motor in gear with the truck axle, the free ends or nose pieces of which extend from the axle on both sides thereof, side uprights at front and rear of the axle and cross bars on the uprights, forming supports for the free ends located above the axle, said supports having springs and being independent of the motor or its framing, substantially as described.

7. The side bars 14, the upwardly extending supports 26 secured to the side bars, the transverse bars 33, 34 secured to the upwardly extending supports and set on edge, and a thimble and pendant secured to said bars, substantially as described.

8. The side bars 14 having the upwardly extending supports 26, transverse bars 33, 34 distanced apart and set on edge, their ends being secured to the said upwardly extending supports, a thimble 41 placed between said bars, a pendant 48 secured to said thimble, and a central aperture in said thimble adapted to permit said pendant to pass through said aperture, substantially as described.

9. The upwardly extending supports 26 having the legs 27 and upwardly extending arch 29, substantially as described.

10. The side bars 15, the upwardly extending supports 26 having the legs 27 recessed, as at 28 for the reception of said side bars, recesses in the upper portion of said supports, and transverse bars 33 secured on edge within said recesses, substantially as described.

11. The saddles 4 provided with an opening in the lower part thereof, lugs 16 on the lower part of the saddles, and a cross bar 17 recessed to receive the lugs secured to the saddles, substantially as described.

12. The upper chord 8, the spring caps 9 having lugs 10, bolt 11 passing through the lug and upper chord for securing the spring cap thereto, and a spring post 7 passing through the spring caps and upper chord, substantially as described.

13. The saddles 4 supported on the axleboxes, the extended side beams 15, the brace 52 for supporting the extended ends of the side beams, secured thereto and supported on the saddles, and the fender 57 supported on the side beams by the forked bar 58, the forks being secured each near an end of said extended beam, substantially as described.

14. The independent spring caps 9 having a recess for the reception of the spring, and a lug 10 for securing the said spring cap to the upper chord or car sill of the truck, substantially as described.

Signed at the city of Philadelphia, county of Philadelphia, and State of Pennsylvania this 5th day of November, 1891.

JOHN A. BRILL.
WALTER S. ADAMS.

Witnesses:
HOWARD DICKEY,
HENRY C. ESLING.